United States Patent [19]

Zado

[11] Patent Number: 4,495,007

[45] Date of Patent: Jan. 22, 1985

[54] SOLDERING FLUX

[75] Inventor: Frank M. Zado, Lawrence Township, Mercer County, N.J.

[73] Assignee: AT&T Technologies, Inc., New York, N.Y.

[21] Appl. No.: 588,634

[22] Filed: Mar. 12, 1984

[51] Int. Cl.³ .................... B23K 35/36; B23K 35/34
[52] U.S. Cl. ..................................... 148/23; 148/24; 148/25; 106/268
[58] Field of Search ............................ 148/23, 24, 25

[56] References Cited

U.S. PATENT DOCUMENTS

| | | | |
|---|---|---|---|
| 2,361,867 | 10/1944 | Pessel | 148/25 |
| 2,710,272 | 6/1955 | Cook | 148/25 |
| 2,898,255 | 8/1959 | Thompson et al. | 148/23 |
| 3,459,606 | 8/1969 | Becker | 148/23 |
| 3,915,729 | 10/1975 | Eustice | 106/268 |
| 4,168,996 | 9/1979 | Zado | 148/23 |
| 4,194,931 | 5/1980 | Zado | 148/25 |
| 4,342,607 | 8/1982 | Zado | 148/23 |
| 4,360,392 | 11/1982 | Roberts | 148/23 |

Primary Examiner—Veronica O'Keefe
Attorney, Agent, or Firm—Joel F. Spivak

[57] ABSTRACT

A solder flux comprises rosin, an activator, an optional surfactant and the dimer of linoleic acid.

25 Claims, 2 Drawing Figures

SOLDERING FLUX

TECHNICAL FIELD

This invention relates to a soldering flux and more particularly, to a non-corrosive soldering flux.

BACKGROUND OF THE INVENTION

In soldering electronic components, circuits, equipment, etc., various kinds of fluxes are used together with soldering material so as to improve the efficiency of the soldering operation, to secure the soldered connections and to improve the long-term reliability of the connections. Conventionally, three kinds of fluxes are mainly used: (1) water soluble flux which is made from inorganic acids, organic acids, amine hydrohalides, etc., (2) natural rosin and (3) activated rosin having a halogenated compound, e.g., an amine hydrohalide, incorporated with natural rosin.

Various additives have been added to rosin to form an activated rosin flux. Keto acids, for example, levulinic acid, have been combined with rosin (see U.S. Pat. No. 2,361,867). Adipic acid has also been combined with rosin in the formation of a flux core. Also, it has heretofore been known to combine adipic acid and levulinic acid with rosin to form a solder flux.

Water-soluble flux is very useful in removing oxides from the metal surface to be soldered. However, there are disadvantages in that the water-soluble flux is apt to destroy metallic material and to leave residues which corrode the soldered parts after soldering. The corrosion impairs the reliability of the soldered parts with respect to electrical and mechanical properties. This undesirable property of water-soluble flux can only be solved by using an extremely efficient flux residue removal and cleaning process.

Natural rosin which is available under a name of WW rosin (water white rosin) presents no problems with respect to corrosiveness, but is inferior as a soldering adjuvant.

Activated rosin has a stability similar to natural rosin and causes little corrosion at room temperature. Also, fully activated or liquid rosin activated (LRA) fluxes have a strong fluxing action at the soldering temperature due to activators, such as an amine hydrochloride, which are typically present in high concentrations such as 1 to 10 weight percent of the resultant flux. However, the fully activated rosin or LRA flux has disadvantages in that a corrosive gas is produced at soldering temperature and can harm the surface of metals such as copper, brass, etc. Moreover, the residues of the activated rosin combine with moisture and produce an acid which causes spontaneous corrosion similar to that produced by the water-soluble flux. Presently available fluxes containing organic hydrohalides, in the form of neutral salts, e.g., glutamic acid hydrochloride, either form corrosive metal halides at elevated temperature or the residues thereof combine with moisture at room temperature to form a corrosive acid and thus are used with possible deleterious effect for electrical soldering applications.

U.S. Pat. No. 2,898,255 reveals an activated rosin comprising a monocarboxylic acid, such as formic acid, combined with a dicarboxylic acid, such as glutamic acid. Such a flux, however, is too acidic and corrosive for practical use in electronics soldering operations. Such a flux is typical of an LRA flux which is corrosive, as evidenced by the standard copper mirror test outlined in the Electronics Industries Association Standard Number RS-402, for liquid rosin fluxes (approved Mar. 27, 1973).

A soldering flux which is superior in fluxing action and is free from corrosive action at room temperature as well as free from harmful residues is therefore desired. Such a flux is described in U.S. Pat. No. 4,168,996, issued Sept. 25, 1979. While the fluxes described in that patent meet the objectives as set forth above providing very high soldering efficiency, a specific problem of solder adherence to the dielectric has been encountered when this or other fluxes are used on specific types of substrates. The problem is most often observed when the substrate surface is an incompletely cured epoxy or rubber-modified epoxy. This solder sticking can result in electrical shorts leaving the circuits frequently beyond repair. I have now discovered a means of modifying the previously described solder formulation of U.S. Pat. No. 4,168,996 which is incorporated herein by reference to essentially eliminate solder sticking while still retaining the beneficial characteristics of the prior formulation.

SUMMARY OF THE INVENTION

The present invention is directed to a soldering flux and a method of soldering using said flux. The novel solder flux which is a non-corrosive type flux, comprises a rosin mixture comprising (a) rosin, (b) an activator having at least one halogen atom and at least one destabilizing functional group and (c) a dimer acid, e.g., the one derived from linoleic acid.

In the preferred embodiment, the rosin mixture also includes an acid surfactant selected from (a') a polycarboxylic acid, (b') a hydroxyl substituent of (a'), (c') a keto acid and (d') a mixture of any of the foregoing surfactants.

BRIEF DESCRIPTION OF THE DRAWINGS

The effect of soldering with a novel solder flux as compared to a prior art flux may be seen with reference to FIGS. 1 and 2 wherein FIG. 1 is a photograph of a printed wiring board soldered with a prior art soldering formulation while

DETAILED DESCRIPTION

Figure 1:
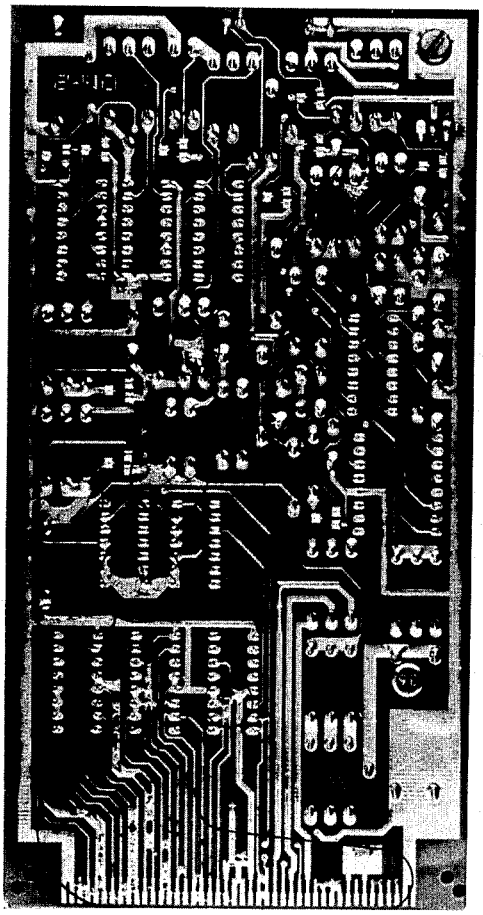

The present invention is based upon the discovery of a unique dimer acid modified non-corrosive solder flux. The term "corrosive" used herein in describing the solder flux means that the flux either (1) leaves an ionic residue on a surface being treated therewith, which ionic residue is present in an amount sufficient to corrode the surface upon the application of electricity thereto, or (2) is acidic enough to corrode the surface to which it is applied and which typically exhibits a pH of its aqueous solution of less then 3. The term "dimer acid" which is commonly used in the chemical industry represents dimerized linoleic acid available, e.g., from EMMERY Industries Inc. as EMPOL dimer acid in various gradations.

The novel solder flux comprises a rosin mixture comprising rosin, an activator and a dimer acid. For most applications, the flux further includes an acid solder surfactant. More particularly, the rosin mixture comprises about 50 to about 80 weight percent of rosin, about 1.0 to about 15 weight percent of a nonionic activator, from 0 to about 25 weight percent of surfactant and from about 2 to about 25 weight percent of dimer acid. The terms "weight percent" and "percent by weight" as used herein mean weight of a component per total weight of a flux "solids".

The particular rosin employed in the formulation may be a natural rosin such as water white rosin (WW rosin). Water white rosin is a well known material. Chemically, water white rosin is a mixture of several compounds. While the specific composition of the individual rosin utilized will vary depending upon a raw material source, water white rosin can generally be typified as a mixture of isomeric diterpene acids. The three major components are abietic acids, D-pimaric acid and L-pimaric acid. An "average" rosin will comprise up to 80-90 weight percent abietic type acids, with the pimaric acids comprising 10-15 weight percent. The designation "water white rosin" refers to a grade of rosin determined by a conventional colorimetric method.

In addition to water white rosins, other rosins, such as hydrogenated wood rosin, and disproportionated, dimerized wood or WW rosin, toll oil rosin etc., as is well known in the art, can be employed.

Combined with the rosin in the mixture is a suitable activator. An activator is a compound which cleans and prepares the surface to be soldered as by removing undesirable deposits, such as oxides. A suitable activator is any organic compound which contains at least one halogen atom, e.g., Cl, Br, etc., and at least one destabilizing atomic group or atom which permits the compound to decompose at or slightly below the soldering temperature employed, typically about 185° C. to 277° C. Since the halogen atom is electron withdrawing, the destabilizing group or atom should also be electron withdrawing thereby creating an instability in the compound due to the competing, i.e., opposed, electron withdrawing properties of at least two atoms or groups. Some typical destabilizing groups include the carboxyl group, carbonyl group, the aromatic hydrocarbon group or aryl group, e.g., phenyl, naphthyl, benzyl p-tolyl and the phenacyl group etc., and a second halogen atom, e.g, Cl, Br, etc.

The activator compound may comprise any organic compound having the following chemical structure

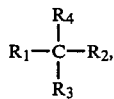

wherein $R_1$ is a halogen atom, $R_2$ is a destabilizing group selected from (1) the carboxyl group, (2) the aryl group, e.g, the phenyl, naphthyl, phenanthryl group, etc., the alkaryl group, the aralkyl group, the aryloxy group, (3) the carbonyl group, e.g.,

where R' is an alkyl radical, cycloalkyl radical, aryl radical, heterocyclic radical or the hydrogen atom, and (4) the halogen atom, $R_3$ and $R_4$ are the same as $R_1$ or $R_2$ or comprise an organic group or radical selected from alkyl, cycloalkyl, alkoxy and heterocyclic radicals or the hydrogen atom.

Preferred suitable activators include halogenated mono and dibasic (mono or dicarboxylic) organic acids.

The acid activators have at least one halogen atom, e.g., Cl, Br, etc., preferably at the alpha position, i.e., at the carbon atom adjacent to the carboxyl group. Suitable halogenated monobasic (carboxylic) acids are those having at least 12 carbon atoms, e.g., 2-bromo-tetradecanoic acid, 2-bromo-octadecanoic acid, and typically comprise 12 to 18 carbon atoms. If the monobasic acid has less than 12 carbon atoms the resultant rosin flux may be too acidic and/or corrosive for electronics use and it may volatilize from the rosin flux and be lost prior to reaching the soldering temperature, e.g., typically 185° C.–260° C.

Suitable halogenated dicarboxylic (dibasic) organic acids are those having at least 4 carbon atoms, e.g., halogenated substituted succinic, adipic, pimellic acids, etc., e.g., 2,3-dibromosuccinic acid, 2-bromosuccinic acid, 2,2-dibromo-adipic acid, etc., and typically comprise 4 to 10 carbon atoms. If the dibasic acid has less than 4 carbon atoms, the resultant flux is too acidic and is corrosive.

The activator is present in the resultant rosin mixture in an amount sufficient to remove surface deposits such as oxides. The activator is present in an amount ranging from about 1 to about 15 weight percent of the resultant flux "solids" mixture. If the activator is present in an amount less than about 1 weight percent, the activator effect thereof is insufficient. If the activator is present in an amount greater than about 15 weight percent, then residues of a rosin flux employing the rosin mixture occurring after soldering, may become corrosive.

Of course, mixtures of various activators described above may be employed for the solder flux.

Generally, combined with the rosin and the activator in the rosin mixture is a solder surfactant. By "solder surfactant" is meant a compound which is principally added to the solder flux to aid in the spreading of the molten solder upon subsequent application thereof. The solder surfactant is a compound which improves the solder wetting rate of a surface, i.e., the surfactant enables better and more uniform spreading of molten solder across the surface to be soldered. Suitable surfactants include polybasic acids, e.g., polycarboxylic acids such as dicarboxylic and tricarboxylic acids. The dibasic acids typically have 4 to 10 carbon atoms. Suitable tricarboxylic acids typically comprise acids having 6 to 7 carbon atoms.

Other suitable surfactants include hydroxyl substituted polybasic acids, i.e., the hydroxyl substituents of the polybasic acids described above. Some typically hydroxyl substituted acids include tartaric acid and citric acid, however, these acids are generally too acidic to be used in manufacturing of sensitive electronic products.

In addition, keto fatty acids or ketone acids, e.g., levulinic

are suitable surfactants. A particularly effective solder flux is one comprising a surfactant mixture of a polybasic carboxylic acid, e.g., adipic acid, combined with a keto acid, e.g., levulinic acid.

For most applications the selected surfactant is present in the rosin mixture in an amount of at least 5 weight percent of the resultant flux solids rosin mixture. However, for certain military applications, in order to meet specific military requirements the amount of surfactant must be either substantially reduced or omitted completely.

An additional constituent in the improved solder formulation of the present invention is the dimer of linoleic acid, i.e., dimerized 10,12 octadecanedienoic acid.

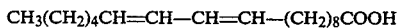

The dimer acid should be present in the amount ranging from about 5 to about 25 weight percent. The addition of this specific dimer to the solder flux formulation has obviated a solder sticking problem as hereinafter discussed.

It may be noted at this point that certain types of printed wiring substrates exhibit a tendency to interact with a molten solder alloy during regular mass soldering operations in such a way as to lead to an excessive deposit of solder on the printed wiring board circuit lines and at times on the printed wiring board substrate itself. These solder deposits which are generally granular or gritty in appearance are found in forms which are commonly termed webs, foils, wisps and crosses. These forms can lead to unwanted shorting between closely spaced conductive lines on the printed circuit board. Their presence becomes especially detrimental in the modern, high density, fine line spacing printed circuit boards. Referring to FIG. 1, there is shown a printed circuit board wherein the soldering operation used a prior art formulation similar to the novel formulation disclosed herein but without a dimer acid included in the formulation. It can be seen in various places that unwanted production of solder buildup or faults occur. For example, one can observe such faults in the areas indicated by circles drawn in over the actual photo of the affected circuit.

Figure 2:
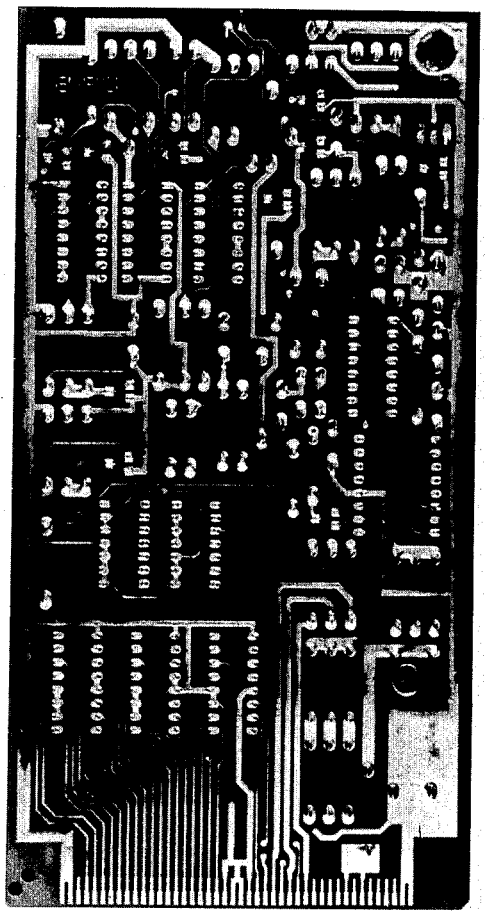
FIG. 2 is a photograph of a similar printed wiring board having been treated with the novel solder flux prior to soldering.

In comparison, FIG. 2 shows a similar circuit board soldered after employing a novel flux as described herein which includes the dimer acid. It can be seen that when the novel flux is employed which incorporates the dimer acid, the solder faults previously observed are essentially eliminated. Thus, the novel formulation significantly reduces solder defects, such as in wave soldering applications.

In one embodiment, the rosin mixture, is typically contained in a suitable vehicle, e.g., a solvent carrier, in the form of a liquid to form a liquid solder flux. The rosin mixtures described above may be dissolved in a suitable solvent in order to form the liquid solder flux. Such solvent vehicle includes any solvent which is chemically inert with the rosin mixture constituents and in which the rosin mixture is solderable. Some suitable solvents include aliphatic alcohols, e.g., methanol, ethanol, isopropanol, 2-butoxyethanol, amyl alcohols, etc., alkanolamines, e.g., ethanolamine, diethanolamine, etc., chlorinated hydrocarbons, e.g., perchloroethylene, trichlorethylene, etc. or the mixture thereof, as the specifics of the intended fluxing process required. Where a non-flammable liquid solder flux is required, the solvent employed is a non-flammable solvent such as a chlorinated hydrocarbon, e.g., perchloroethylene, trichloroethylene, etc.

The rosin mixture is combined with the solvent and mixed, using conventional techniques, to form a homogeneous solution. For ease in dissolution, the solvent is vigorously agitated and/or maintained at an elevated temperature, e.g., 90°-100° F. for isopropyl alcohol, and upon complete dissolution is cooled to room temperature. Of course, proper health and safety precautions in handling flux solvents need to be exercised.

The rosin mixture is present in the resultant liquid rosin flux in an amount sufficient to yield the desired fluxing action, which in turn is dependent upon the metal members to be joined and the degree of solder to be applied and the manner of applying it. Typically, the rosin mixture is present in the liquid rosin flux in an amount ranging from about 10 to 50 weight percent, e.g., 10 to 80 weight percent rosin mixture, remainder ethanol. Specific fluxing requirements may require flux composition outside the above range which is intended only for general purpose fluxing operation.

Additionally, the liquid rosin flux may contain a foaming expedient in the form of a surface active foaming agent to improve the wetting of and to insure uniform flux deposition on hard to wet surfaces to be soldered. Suitable foaming agents include non-ionic surface active agents. Among typical suitable foaming agents are those derived from flurocarbons such as the "ZONYL" series manufactured by E. I. DuPont de Nemours; the "FLUORAD" series manufactured by Minnesota Mining and Manufacturing Company (3M Company), e.g., a perfluoropolyacrylate such as FC-430; polyethyleneoxy non-ionic ethers such as the "Triton" products manufactured by Rohm & Haas Company, e.g., "Triton X-100," "Triton X-165"; and non-ionic surface agents based on the reaction between nonylphenol and glycidol such as surfactants 6G and 10G manufactured by the Olin Company. The amount of surface active agent is not critical, the amount being sufficient to provide the degree of wetting and uniformity thereof desired. Typically, the surface active or foaming agent is present in an amount ranging from 0.01 to 0.1 weight percent of the resultant liquid flux.

Alternatively, instead of employing a foaming agent as a foaming expedient, as described above, a stabilizer solvent which stabilizes foaming may be combined with the suitable vehicle, e.g., ethanol, isopropanol, etc. Such suitable foaming expedients, that is suitable stabilizer solvents, include alkanolamines, e.g., ethanolamine, diethanolamine, triethanolamine, etc. Where the solvent vehicle does not already contain an alkanolamine, the alkanolamine is added thereto to function as the foaming expedient. Typically, the stabilizer solvent, e.g., ethanolamine, is present in an amount of about 0.1 to about 2 percent by weight of the total weight of the resultant flux.

In operation of the metal surface of a first member and the metal surface of a second metal surface, to be soldered and joined together, are treated with the liquid solder flux using any conventional technique, e.g., dipping, spraying, brushing, rolling, foaming, wave fluxing, etc. The solvent of the flux is evaporated and at least one of the flux treated surfaces is then treated with molten solder, again using any conventional technique, e.g., wave soldering, to form a desired solder deposit. The second metal surface is contacted to the molten solder deposit to link the surfaces and the solder deposit is cooled below the liquidus temperature thereof to solder join the surfaces together.

In wave soldering, for example, the liquid solder flux is pumped continuously through a trough or other suitable vessel to form an exposed or standing wave of liquid flux or its foam. The metal surface of the first member and the second member is passed through or contacted with the standing wave of liquid flux or foam. Each member is then heated to remove the volatile constituents of the flux. A continuous stream of solder is then typically pumped up into a spout forming a head or wave of solder through which at least one of the members is passed to wet the metal surface thereof to be joined.

Where extremely difficult to solder surfaces are encountered, e.g., copper-tin-nickel alloy surfaces, metal surface shaving a heavy tarnish or metal oxide layer, etc., LRA solder fluxes, as classified in the Electronics Industries Association (EIA) Standard Number RS-402 (approved Mar. 27, 1973) [for liquid rosin fluxes], have heretofore been employed which contain large concentrations, e.g., 1 to 12 weight percent of the resultant flux of organohydrohalides, such as glutamic acid hydrochloride or amine hydrohalides, such as diethylamine hydrochloride and cetyl trimethylammonium bromide. However, such LRA fluxes are too corrosive and too acidic for most electronic applications. The above-described novel liquid flux comprising the novel rosin mixture, solvent and optionally foaming expedient, is successfully employed for such difficult to solder surfaces. Preferably, a secondary activator is added to the above-described rosin flux mixture and optionally the foaming agent or stabilizer solvent, to form a mildly activated or LRMA liquid flux which achieves extremely successful soldering to such extremely difficult to solder surfaces without the accompanying defects of high acidity and corrosiveness. The secondary activator comprises any chemically compatible organohydrohalide which is capable of releasing a hydrogen halide or a halogen itself at the elevated temperature employed, that is at the soldering temperatures, e.g., 185°-260° C. Suitable secondary activators include glutamic acid hydrochloride, amine hydrohalides, e.g., diethylamine hydrochloride, ethoxyamine hydrochloride and substituted ammonium halides such as cetyl trimethylammonium bromide. The maximum amount of the secondary activator combined with the rosin mixture and present in the resultant liquid flux is critical. The secondary activator, e.g., diethylamine hydrochloride, is combined with the rosin mixture in an amount ranging from about 0.17 to about 0.28 weight percent of the resultant combined components. If the amount of the secondary activator is greater than about 0.28 weight percent of the combined rosin mixture and secondary activator, then the resultant flux is too corrosive, leading to residues which corrode the soldered surfaces or parts after soldering and application of electrical power thereto, thereby impairing the reliability thereof with respect to electrical and mechanical properties. Of course, such a condition cannot be tolerated for electronic soldering applications. If the secondary activator is kept within the above critical concentration range, the resultant liquid flux is an LRMA or mildly activated flux as described in the aforementioned EIA Standard Number RS-402.

A particularly superior liquid flux is obtained when the activator comprises a dibromostyrene, e.g., 1,2-dibromo-1-phenylethane, and the secondary activator comprises diethylamine hydrochloride.

It is, of course, to be understood that the rosin mixture may be combined with any suitable vehicle known in the soldering art to form any conventional fluxing medium, e.g., solid, liquid, paste or paint, and the invention contained herein is not limited by the particular rosin mixture employed or the resultant flux medium itself, be it solid, liquid or paste.

In forming a solid or semisolid (paste) flux, the rosin mixture of rosin, activator and surfactant (optionally combined with the secondary activator) is combined with a conventional binder material vehicle, e.g., a grease binder, a wax binder, a glue binder, paraffin wax, etc., and additionally where a paste is desired, with a suitable solvent, e.g., a terpene, an alcohol, etc., which gives the proper consistency. Typically, a rosin mixture, comprising 0.3 to 7 weight percent activator, at least one weight percent surfactant, 2 to 25 weight percent dimer acid and typically 1 to about 15 weight percent surfactant, and a remainder of rosin, e.g., 50 to 95 weight percent rosin, is present in an amount up to 50 to 95 weight percent in both the solid flux and the paste flux, respectively.

In another embodiment, the rosin mixture of rosin, activator, dimer acid and surfactant, optionally combined with the secondary activator, is directly combined with the particular solder alloy to be employed in a simultaneous flux and alloy application. In one such application, the rosin mixture is directly combined with the selected alloy in the form of a soldering paste. The solder alloy, which is in powder form, is intimately mixed or suspended in a medium comprising the rosin mixture (rosin, activator and surfactant), and a suitable paste carrier, such as for example paraffin wax, turpentine, glycol ethers and/or polyethylene glycols, etc. It is to be noted that any conventional paste carrier known in the art may be employed provided that it is chemically compatible with the rosin mixture and the solder alloy selected. Typically, the powdered solder alloy is present in the paste in an amount ranging from 70 to 90 weight percent whereas the rosin mixture, comprising 50 to 96 weight percent rosin, 0.3 to 7 weight percent activator, 1 to 25 weight percent dimer acid and a remainder of at least one weight percent surfactant, 1 to about 15 weight percent surfactant, is present in an amount of 10 to 30 weight percent. The resultant solder-flux paste may be applied to a surface to be joined by dispensing (syringe type), rolling, screening or stenciling.

In a second application for simultaneously applying flux and solder, the rosin flux mixture (rosin, dimer acid, activator and surfactant) and optionally the secondary activator is combined with a selected soft solder alloy, in the form of a solder core. The rosin mixture is contained as a solid, powder or even as a paste, within a wire of the solder alloy, functioning therein as the core. Usually, the solder alloy is simultaneously extruded with the flux mixture to form a solder core. Typically, the flux mixture, e.g., comprising 50 to 96 weight percent rosin, 0.3 to 7 weight percent activator, 1 to 10 weight percent dimer acid and a remainder of at least one weight percent surfactant, e.g., 1 to about 15 weight percent surfactant, is present in the solder wire in an amount of about 0.5 to 5 weight percent of the total solder core wire. Dimer acid itself plays a role of the flux plasticizing agent needed for the cored wire extrusion pocess.

It is to be pointed out and stressed hereat that the use of the rosin mixture comprising rosin, activator, surfactant and optionally the foaming expedient and/or optionally the secondary activatorleads to a solder joint containing a minimum amount of solder as exhibited by forming a shallow solder joint meniscus.

EXAMPLE I

A. For comparison purposes, a printed wiring board comprising an FR4 epoxy substrate with a copper pattern thereon was employed. The copper pattern had a solder coat thereon. A solder flux without a dimer acid was prepared containing 23.0 weight percent WW Rosin, 3.0 weight percent azelaic acid, 0.6 weight percent styrene dibromide and 73.4 weight percent isopropyl alcohol. The solder flux was applied, by brushing, to the solder coated copper pattern. The solvent from the solder was allowed to evaporate and the flux-treated copper pattern was immersed in a molten solder bath for 5 seconds. A dull finish, containing extraneous solder deposits resulted as illustrated in FIG. 1.

B. The procedure of EXAMPLE 1-A was repeated except that 10 weight percent of linoleic acid dimer was included in the rosin mixture employed in preparing the flux. The linoleic acid dimer was substituted for the equivalent amount of rosin in the flux mixture. As can be shown in FIG. 2, essentially all the extraneous solder deposits were eliminated.

As previously indicated, the particular solder flux formulation depends on the mode of application of the solder, e.g., foaming or spray application, brushing or dipping, as well as the means employed for soldering, e.g., wave soldering, solder leveling, etc. Typical for wave soldering employing foaming or spray application, the percent solids in the solder flux is preferably from 15 to 40 percent. Other types of flux used in applications, as stated, may require different solids content. A preferred solder formulation in a liquid solder flux contains, by weight percent, 8.5 percent linoleic acid dimer, 11.5 percent rosin, 1.5 percent azelaic acid, 0.6 percent styrene dibromide and the balance being the vehicle, 77.9 percent isopropyl alcohol. Such fluxes are capable of passing high reliability testing for such parameters as insulation resistance, corrosion to copper, acidity and a halide test. In the event such high reliability testing is not required or if outside industry is desirous of using formulations for military equipment employing a rosin mildly activated (RMA) type flux, the amount of acid type surfactant azelaic acid may be reduced or completely eliminated from the formulation. Further for other mil specs it is preferable to substitute an aminehydrochloride for the styrene dibromide activator.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. A solder flux which comprises:
   (a) rosin;
   (b) an activator having at least one halogen atom and at least one destabilizing substituent;
   (c) a surfactant selected from the group consisting of (a') a polycarboxylic acid, (b') a hydroxyl substituent of (a'), (c') a keto acid and (d') a mixture of any of the foregoing surfactants; and
   (d) the dimer of linoleic acid, wherein said activator is present in an amount of from 1 to 15 weight percent and said surfactant is present in an amount of from 0 to 25 weight percent.

2. The flux as defined in claim 1 which further comprises a flux vehicle.

3. The flux as defined in claim 1 which further comprises a secondary activator comprising an organohydrohalide.

4. The flux as defined in claim 1 which further comprises a foaming expedient selected from the group of expedients consisting of a surface active agent and a stabilizer solvent.

5. The flux as defined in claim 1 wherein said activator comprises a halogen substituted carboxylic acid.

6. The flux as defined in claim 1 wherein said surfactant comprises a polycarboxylic acid selected from the group consisting of dicarboxylic acid having at least 4 carbon atoms, a tricarboxylic acid having 6 to 7 carbon atoms and a mixture thereof.

7. The flux as defined in claim 1 which comprises rosin, a dibromosuccinic acid and adipic acid.

8. The flux as defined in claim 7 which further comprises levulinic acid.

9. The flux as defined in claim 1 which comprises rosin, azelaic acid and a dibromostyrene activator.

10. The flux as defined in claim 9 which further comprises a secondary activator comprising diethylamine hydrochloride.

11. The flux as defined in claim 1 wherein said rosin is present in an amount ranging from about 10 to about 80 weight percent, said activator is present in an amount ranging from about 1 to about 15 weight percent, said dimer is present in an amount of from 2 to 25 weight percent and said surfactant is present in a remainder amount of at least one weight percent.

12. The flux as defined in claim 11 wherein said rosin, said activator and said surfactant are dissolved in a solvent vehicle in an amount ranging from about 10 to about 80 weight percent of the resultant solution.

13. A soldering flux comprising a rosin mixture which comprises:
   (a) rosin;
   (b) an activator comprising an organic acid selected from the group consisting of a monocarboxylic acid having at least 12 carbon atoms, a dicarboxylic acid having at least 4 carbon atoms and a mixture thereof, said organic acid having at least one halogen atom;
   (c) a surfactant comprising an organic acid selected from the group consisting of (a') a dicarboxylic acid having at least 4 carbon atoms, (b') a hydroxyl substituent of (a'), (c') a keto acid and (d') a mixture of any of the foregoing acids; and
   (d) 2 to 25 weight percent of linoleic acid dimer and wherein said activator is present in an amount of from 0.3 to 7 weight percent and said surfactant is present in an amount of 0 to 25 weight percent.

14. The flux as defined in claim 13 which further comprises a vehicle.

15. The flux as defined in claim 14 wherein said vehicle comprises a solvent selected from the group consisting of an aliphatic alcohol, an alkanolamine, a chlorinated hydrocarbon and a mixture of any of the foregoing solvents.

16. The flux as defined in claim 15 which further comprises a foaming expedient.

17. The flux as defined in claim 13 which further comprises a secondary activator comprising an organohydrohalide.

18. The flux as defined in claim 13 wherein said monocarboxylic acid activator comprises 12 to 18 carbon atoms.

19. The flux as defined in claim 13 wherein said dicarboxylic acid activator, said dicarboxylic acid surfactant and said hydroxyl substituent thereof each comprise 4 to 10 carbon atoms.

20. The flux as defined in claim 13 which comprises rosin, a dibromosuccinic acid and adipic acid.

21. The flux as defined in claim 20 which further comprises levulinic acid.

22. The flux as defined in claim 13 wherein, in said rosin mixture, said rosin is present in an amount ranging from about 50 to about 96 weight percent, said activator is present in an amount ranging from about 1 to about 7 weight percent, said dimer is present in an amount of from 2 to 25 weight percent and said surfactant is present in a remainder amount of at least one weight percent.

23. The flux as defined in claim 22 which further comprises a secondary activator comprising an organohydrohalide combined with said rosin mixture in an amount ranging from 0.17 to about 0.28 weight percent of the total weight of combined components.

24. The flux as defined in claim 22 which further comprises a solvent vehicle in which said rosin mixture is dissolved in an amount ranging from about 10 to about 80 weight percent of the resultant flux.

25. The flux as defined in claim 24 which further comprises a foaming expedient.

* * * * *